R. A. FOWDEN.
PISTON PACKING.
APPLICATION FILED JUNE 22, 1910.
987,057.
Patented Mar. 14, 1911.
2 SHEETS—SHEET 1.
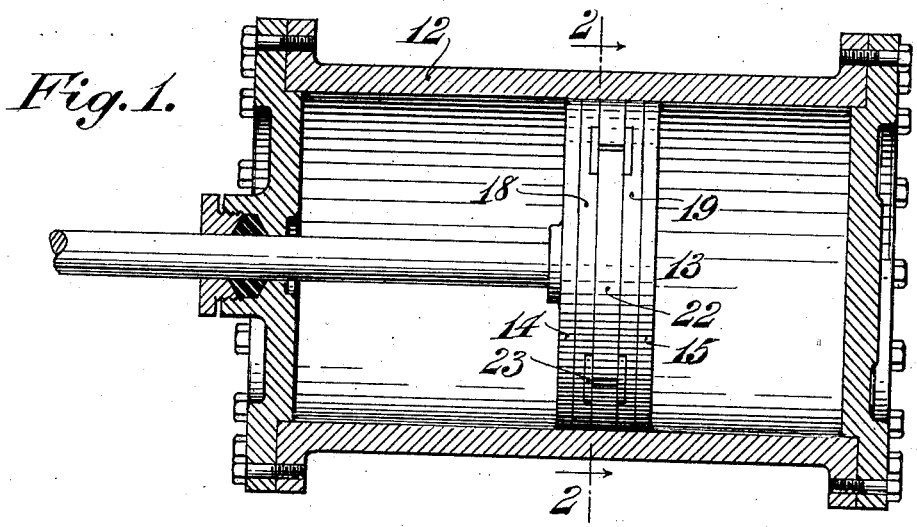
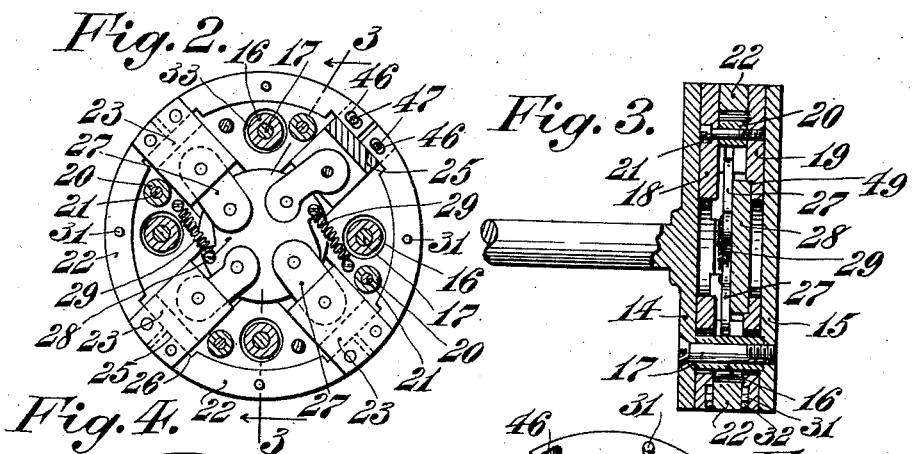
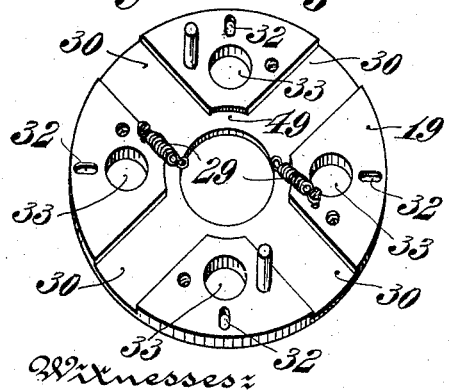
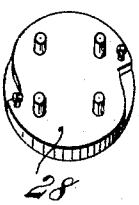
Witnesses:
Percival K. Reed.
Hubert B. Painter.
Inventor:
Robert A. Fowden,
By Jas. C. Nobmsmith
Attorney R. A. FOWDEN.
PISTON PACKING.
APPLICATION FILED JUNE 22, 1910.
987,057.
Patented Mar. 14, 1911.
2 SHEETS—SHEET 2.
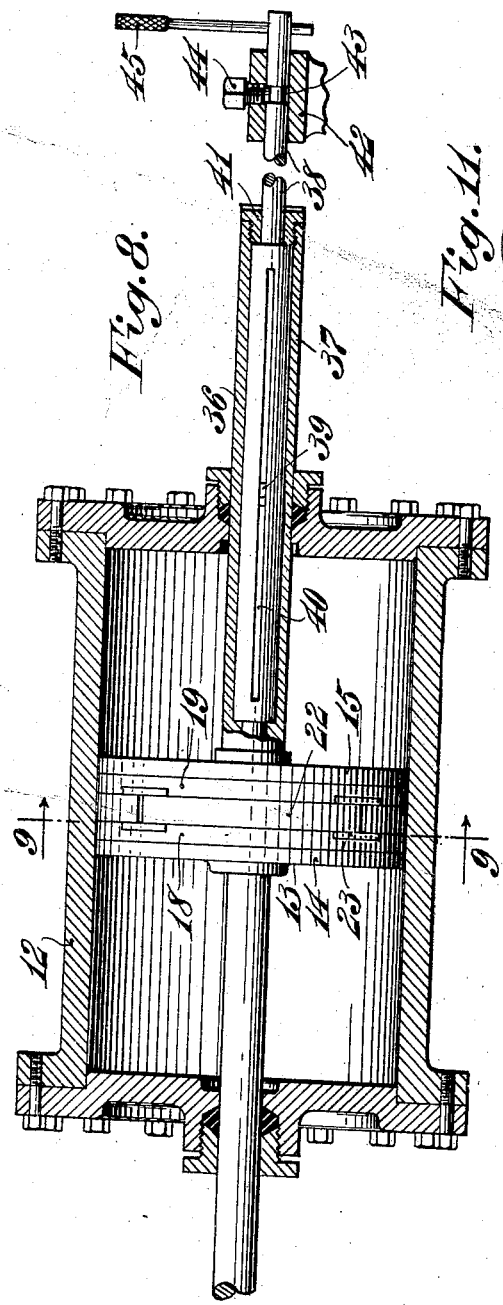
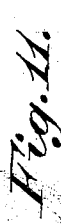
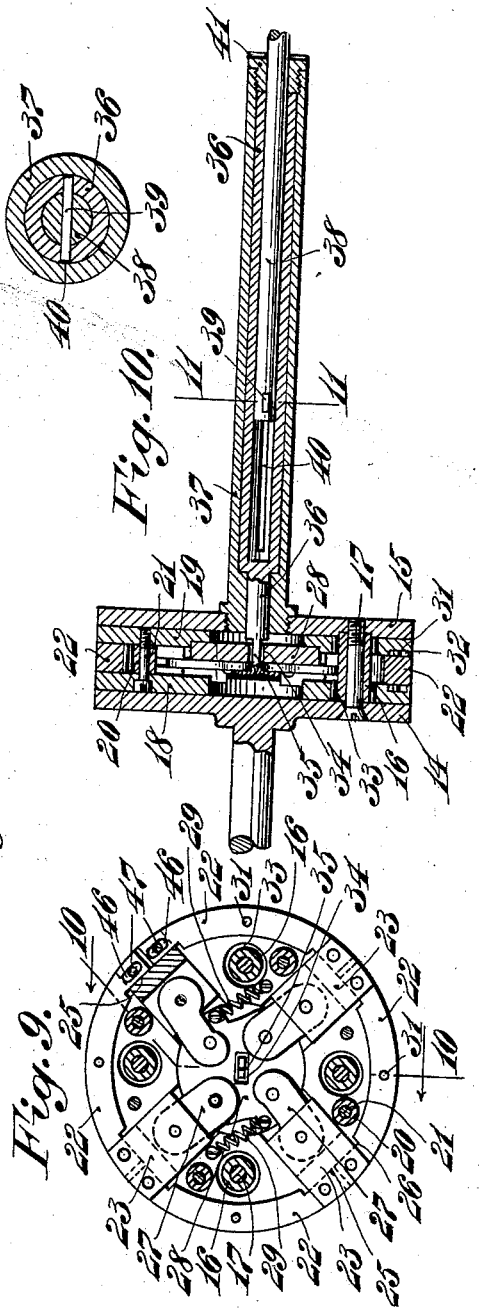
Witnesses:
Percival K. Reed.
Herbert B. Painter.
Inventor:
Robert A. Fowden,
By Jas. C. Wobensmith
Attorney

UNITED STATES PATENT OFFICE.

ROBERT A. FOWDEN, OF PHILADELPHIA, PENNSYLVANIA.

PISTON-PACKING.

987,057.  Specification of Letters Patent.  Patented Mar. 14, 1911.

Application filed June 22, 1910. Serial No. 568,270.

*To all whom it may concern:*

Be it known that I, ROBERT A. FOWDEN, a citizen of the United States, residing at Philadelphia, in the county of Philadelphia and State of Pennsylvania, have invented certain new and useful Improvements in Piston-Packing, of which the following is a specification.

My invention relates to a piston packing and it has particular relation to a metallic packing for steam or other engines, pumps or the like, in which the packing members will bear uniformly at all points against the walls of the cylinder.

It is well known that in the various types of split or spring ring and similar metallic packing commonly in use in steam engines or the like, the resiliency of the spring of the ring is lost in the course of time, due to the wearing of the ring so that recourse has heretofore been had to various other forms of metallic packing wherein dependence was placed on a plurality of independent springs forcing the metallic packing outward at various parts of the circumference of the same. With these forms of packing, however, a disadvantage occurs due to the difference in the pressure of the several springs employed so that uniformity of the pressure of the packing against the cylinder does not exist at all points.

The object therefore of my invention is to provide a simple, durable, and efficient metallic packing for steam or other engines, pumps or the like, in which the packing members will bear uniformly at all points against the surface of the cylinder, and which condition will be maintained notwithstanding any variations or eccentricity of the cylinder with respect to the piston proper.

My invention also contemplates means whereby the pressure of the packing against the walls of the cylinder may be temporarily released.

The nature and characteristic features of my invention will be more readily understood from the following description taken in connection with the accompanying drawings forming part hereof, in which:—

Figure 1 is a vertical, central sectional view of a steam or other engine cylinder with a piston mounted therein containing packing embodying the main features of my present invention; Fig. 2 is a transverse sectional view of the piston shown in Fig. 1, taken approximately on the line 2—2 of Fig. 1; Fig. 3 is a longitudinal, central, sectional view of said piston, taken approximately on the line 3—3 of Fig. 2; Fig. 4 is a perspective view of a disk member forming one of the supporting elements of the packing; Figs. 5, 6 and 7 are perspective views of several of the packing elements; Fig. 8, is a vertical, central, sectional view of a steam or other engine cylinder with a piston mounted therein containing packing embodying the main features of my present invention, and shown with means applied thereto for temporarily releasing the pressure of the packing from the walls of the cylinder; Fig. 9 is a transverse sectional view of the piston and associated parts shown in Fig. 8, taken approximately on the line 9—9 of Fig. 8; Fig. 10 is a longitudinal central sectional view of the piston and associated mechanism shown in Fig. 8, taken approximately on the line 8—8 of Fig. 9; and Fig. 11 is a transverse sectional view of the tail rod of the mechanism shown in Figs. 8, 9 and 10.

In the particular embodiment of my invention shown in the drawings, 12 is an engine cylinder of any preferred type in which is mounted the piston 13, consisting preferably of two disk plates 14 and 15 which are held a fixed distance apart by means of spacing devices, which, as shown in the drawings, may consist of sleeves 16 through which pass screws or bolts 17, the sleeves serving to maintain the disk plates a fixed distance apart, and the screws or bolts acting as the fastening therefor. Mounted between the spaced plates 14 and 15 is the packing device which consists preferably of two disk like members 18 and 19 suitably grooved and channeled to receive the elements of the piston packing, these members 18 and 19 also being held a fixed distance apart by means of sleeves 20 through which pass the fastening screws or bolts 21.

The packing proper consists of a series of non-resilient sector members 22 mounted between the disk members 18 and 19 and the adjoining ends of the sector members 22 are slidably supported in the outer ends of the members 23 which serve to bridge and close the otherwise open passageway or space between the adjoining ends of contiguous sector members 22. Each of the bridging members 23 is grooved as at 24 at its outer end to receive the ends of the sector members 22. The groove 24 of each bridging piece 23 is preferably made with a square base 25, and the ends of the sector members 22 are recessed as at 26 complemental to the square base 25 of the groove 24 of each of the bridging members 23. The bridging members 23 are arranged radially as shown in Fig. 2, in grooves 30 of the disk members 18 and 19 and are each provided with a link 27 pivoted to their inner ends as clearly shown in Figs. 2 and 6 of the drawings. The links 27 have their inner ends pivoted to a rotatable disk member 28 which may be journaled in a recess 49 in the disk member 19. The rotatable disk member 28 is normally under the tension of one or more springs 29 tending to rotate the same to thereby force the bridging members 23 radially outward in the grooves 30 of the disk members 18 and 19 between which the said bridging members are mounted. It will therefore be seen that as the bridging pieces 23 are forced outward, carrying with them the sector members 22, that on account of the location of the pivots forming the connection between the disk members 28 and the link 27, the sector members 22 as well as the bridging pieces 23 will all be forced outward a uniform distance so that the pressure against the walls of the cylinder will be uniform at all points.

It should of course be understood that in the making of the packing, the packing elements are first preferably assembled between the disk members 18 and 19 and locked thereto in any suitable manner and the entire structure then turned to the proper working diameter so that the perimeter of the packing elements will be initially of the proper shape. To prevent circumferential motion of the sector members 22 whereby the same would not remain in proper relationship with respect to the square base 25 of the grooves 24 of the bridging members 23, the sector members 22 are provided with pins 31 projecting from the side faces thereof and guided in radially disposed grooves 32 which are cut in the disk members 18 and 19. It will, of course, be understood that circumferential motion of the bridging members 23 will be prevented on account of said bridging members being mounted in the radial grooves 30 which are cut in the disk members 18 and 19. To allow the piston packing to accommodate itself to any slight eccentricity of the cylinder with respect to the piston, the disk members 18 and 19 are mounted between the piston disks 13 and 14 so as to have a slight sidewise movement with respect thereto, and for this purpose the disks 18 and 19 are provided with apertures 33 for the passage of the spacing sleeves 16, the apertures 33 being slightly larger than the diameter of the sleeves 16 to permit the sidewise movement as aforesaid.

In some cases, for example in starting engines of large size, it has sometimes been desirable, if the same could have been accomplished, to temporarily release the pressure of the packing so as to permit slight leakage past the piston and for this purpose the device shown in Figs. 8 to 11 may be employed in connection with the main form of piston packing as hereinbefore described. The disk 28 which serves to force the sector members outwardly may be provided with a central slot 34 into which may project the flattened end 35 of a spindle 36 which may be mounted in the tail rod 37 which is frequently employed in engines of larger sizes. To permit the flattened end 35 of the spindle 36 to be arbitrarily rotated to thereby temporarily release the pressure of the packing elements, the spindle 36 may have slidably mounted therein a rod 38 which may be provided with a key 39 adapted to engage a slot 40 in the spindle 36. The rod 38 extends out from the end of the tail rod 37 through a gland 41 which serves to retain the spindle 36 within the tail rod 37. The outer end of the rod 38 is supported in a bearing 42 and is channeled as at 43 to receive the end of a set screw 44 so as to prevent longitudinal movement of the rod 38 as the tail rod 37 reciprocates in conjunction with the piston. The outer end of the rod 38 may be provided with a handle 45 for the manual control of the engine operator. It will of course be understood that if desired similar mechanism may be located in the piston rod proper in engines which have no tail rod. To insure the retraction of the sector members 22 when the bridging members 23 are retracted through the intermediary of the above described mechanism the ends of the sector members 22 may be slotted as at 46, the slots extending parallel to the square base 25 of the bridging members 23 and being engaged by pins 47 mounted in said bridging members as clearly shown in the drawings.

Having thus described the nature and characteristic features of my invention, what I claim as new and desire to secure by Letters Patent is:—

1. A piston packing comprising a plurality of non-resilient sector members, a plurality of bridging members in which the ends of said sector members are mounted, means for preventing circumferential motion of said bridging and sector members, and spring controlled means for radially expanding all of said bridging members and sector members simultaneously and uniformly.

2. A piston packing comprising a plurality of non-resilient sector members, a plurality of bridging members in which the ends of said sector members are mounted, means for preventing circumferential motion of said bridging and sector members, links pivoted to said bridging members, and a rotatable member to which said links are also pivoted whereby all of said bridging members and sector members may be simultaneously and uniformly expanded and retracted by the rotation of said rotatable member.

3. A piston packing comprising a plurality of non-resilient sector members, a plurality of bridging members in which the ends of said sector members are mounted, means for preventing circumferential motion of said bridging and sector members, spring controlled means for radially expanding all of said bridging members and sector members simultaneously and uniformly, and means extending external to the cylinder for controlling said bridging members and sector members.

4. A piston packing comprising a plurality of non-resilient sector members, a plurality of bridging members in which the ends of said sector members are mounted, means for preventing circumferential motion of said bridging and sector members, links pivoted to said bridging members, a rotatable member to which said links are also pivoted whereby said bridging members and sector members may be simultaneously and uniformly expanded and retracted by the rotation of said rotatable member, and means extending external to the cylinder for arbitrarily rotating said rotatable member.

5. A piston packing comprising a plurality of non-resilient sector members, a plurality of bridging members in which the ends of said sector members are mounted, links pivoted to said bridging members, a rotatable member to which said links are also pivoted whereby said bridging members and sector members may be simultaneously and uniformly expanded and retracted by the rotation of said rotatable member, a spindle in slotted engagement with said rotatable member and means for arbitrarily rotating said spindle.

6. A piston packing comprising a plurality of non-resilient sector members, a plurality of bridging members in which the ends of said sector members are mounted, spring controlled means for simultaneously and uniformly expanding said bridging members and sector members, and a pair of disks between which the aforesaid parts are mounted, said disks being mounted in the piston in such manner as to be capable of a slight sidewise movement with respect thereto.

7. A piston packing comprising a plurality of non-resilient sector members, a plurality of bridging members in which the ends of said sector members are mounted, links pivoted to said bridging members, a rotatable member to which said links are also pivoted whereby said bridging members and sector members may be simultaneously and uniformly expanded and retracted by the rotation of said rotatable member, a pair of disks between which the aforesaid parts are mounted, said disks being mounted in the piston in such manner as to be capable of a slight sidewise movement with respect thereto.

8. A piston packing comprising a plurality of non-resilient sector members, a plurality of bridging members in which the ends of said sector members are mounted, means for preventing circumferential motion of said bridging and sector members, means for radially expanding and retracting all of said bridging members simultaneously and uniformly, and means for constraining the sector members to expand and retract in conjunction with said bridging members.

9. A piston packing comprising a plurality of non-resilient sector members, a plurality of bridging members in which the ends of said sector members are mounted, means for simultaneously and uniformly expanding and retracting said bridging members, and means for constraining the sector members to expand and contract in conjunction with said bridging members, said means comprising slots in the ends of the sector members and pins carried by the bridging members engaging said slots.

10. A piston packing comprising a plurality of non-resilient sector members, a plurality of bridging members in which the ends of said sector members are mounted, spring controlled means for radially expanding all of said bridging members and sector members, and means for preventing circumferential motion of said sector members.

In testimony whereof, I have hereunto signed my name in the presence of two witnesses.

ROBERT A. FOWDEN.

Witnesses:
WILLIAM S. ATCHISON,
LILLIAN H. NERCIL.

Copies of this patent may be obtained for five cents each, by addressing the "Commissioner of Patents, Washington, D. C."